United States Patent
Simanowski et al.

(10) Patent No.: US 12,139,973 B2
(45) Date of Patent: *Nov. 12, 2024

(54) METHOD AND APPARATUS FOR DAMPING/ABSORBING ROTATIONAL VIBRATIONS/OSCILLATIONS

(71) Applicant: Scientific Drilling International, Inc., Houston, TX (US)

(72) Inventors: Mario Simanowski, Meinersen (DE); Carsten Freyer, Wienhausen (DE); Marco Volgmann, Braunschweig (DE); Josh Wilson, Houston, TX (US)

(73) Assignee: SCIENTIFIC DRILLING INTERNATIONAL, INC., Houston, TX (US)

( * ) Notice: Subject to any disclaimer, the term of this patent is extended or adjusted under 35 U.S.C. 154(b) by 570 days.

This patent is subject to a terminal disclaimer.

(21) Appl. No.: 17/469,616

(22) Filed: Sep. 8, 2021

(65) Prior Publication Data

US 2021/0404268 A1 Dec. 30, 2021

Related U.S. Application Data

(63) Continuation of application No. 17/128,032, filed on Dec. 19, 2020, now Pat. No. 11,142,962.

(60) Provisional application No. 62/952,233, filed on Dec. 21, 2019.

(51) Int. Cl.
  *F16F 7/108* (2006.01)
  *E21B 17/07* (2006.01)
  *F16F 7/112* (2006.01)

(52) U.S. Cl.
  CPC .............. *E21B 17/07* (2013.01); *F16F 7/108* (2013.01); *F16F 7/112* (2013.01); *F16F 2222/08* (2013.01)

(58) Field of Classification Search
  CPC . E21B 17/07; F16F 7/108; F16F 7/112; F16F 2222/08
  See application file for complete search history.

(56) References Cited

U.S. PATENT DOCUMENTS

| | | |
|---|---|---|
| 4,905,776 A | 3/1990 | Beynet et al. |
| 2005/0279565 A1 | 12/2005 | Arian et al. |
| 2007/0289778 A1 | 12/2007 | Watkins et al. |
| 2014/0151122 A1 | 6/2014 | Venugopal et al. |

OTHER PUBLICATIONS

Extended European Search Report issued in EP App. No. 20904226.6 dated Nov. 8, 2022 (7 pages).

*Primary Examiner* — Xuan Lan Nguyen
(74) *Attorney, Agent, or Firm* — Ewing & Jones, PLLC (57) ABSTRACT

A vibration damping device for use with a downhole tool having a tool axis may comprise a device housing mechanically coupled to the downhole tool, wherein the device housing defines a receptacle having a volume and an inner surface; an inertia element movably supported in the receptacle and having a volume, a mass, and a non-zero moment of inertia about the tool axis; wherein the inertia element volume is greater than the receptacle volume and an interstitial volume is defined between the inertia element and the receptacle, and wherein the interstitial volume is occupied by a fluid or an elastomer. The device may include a longitudinal bearing and/or a radial bearing between the inertia element and the receptacle. The device may also include a pressure compensation device in fluid communication with the receptacle and positioned within or an integral part of the device housing.

14 Claims, 12 Drawing Sheets

METHOD AND APPARATUS FOR DAMPING/ABSORBING ROTATIONAL VIBRATIONS/OSCILLATIONS

CROSS REFERENCE TO RELATED APPLICATIONS

This application is a continuation application that claims priority to U.S. nonprovisional application Ser. No. 17/128,032 filed Dec. 19, 2020, which claims priority from U.S. provisional application No. 62/952,233, filed Dec. 21, 2019, each of which is incorporated by reference herein in its entirety.

TECHNICAL FIELD/FIELD OF THE DISCLOSURE

The present disclosure relates generally to damping vibrations or rotational oscillations during drilling operations using rotary steerable systems, and specifically to inertial damping systems converting vibration energy into heat energy, resulting in the desired damping effect.

BACKGROUND OF THE DISCLOSURE

In hydrocarbon drilling operations, boreholes are typically drilled by rotating a drill bit attached to the end of a drill string. The drill bit can be rotated by rotating the drill string at the surface and/or by a fluid-driven downhole mud motor, which may be part of a bottom hole assembly (BHA). For example, a mud motor may be used when directional drilling using a rotary steerable system (RSS). The combination of forces and moments applied by the drill string and/or mud motor and forces and moments resulting from the interaction of the drill bit with the formation can have undesirable effects on the drilling system, including reducing the effectiveness of the cutting action, damage to BHA components, reduction in BHA components life, and interference in measuring various drilling parameters.

SUMMARY

To mitigate such negative effects, a BHA may be equipped with a damping system to draw vibration energy from the BHA and thereby damping the effects associated with torsional vibration excitation.

A vibration damping device for use with a downhole tool adapted to rotate about a tool axis, may comprise a device housing. The device housing may be configured as a cartridge that is mechanically coupled to a downhole tool. The housing may comprise an annular wall having a central bore therethrough. The device housing may define a receptacle having a volume and an inner surface and an inertia element may be movably supported in the receptacle. The inertia element may have a volume, a mass, and a non-zero moment of inertia about the tool axis. The volume of the inertia element may be less than the volume of the receptacle so that an interstitial volume may be defined between the inertia element and the receptacle. The interstitial volume may be occupied by a fluid or an elastomer. The inertia element may be supported within the receptacle in a manner that allows the inertia element to move relative to the device housing.

The device may further include a pressure compensation device. The pressure compensation device may comprise a pressure compensation housing and a piston moveably mounted therein so as to define a variable compensation volume. The variable compensation volume may be in fluid communication with the receptacle. The device may further include at least one longitudinal bearing and at least one radial bearing, each bearing positioned between the inertia element and the inner surface of the receptacle.

The pressure compensation housing may be formed separately from the device housing. If present, the pressure compensation housing may be received within the device housing. Alternatively, the pressure compensation housing may comprise the device housing.

The device may further include, positioned between the inertia element and the inner surface of the receptacle, at least one of a longitudinal biasing means and longitudinal friction pad combination or a radial biasing means and radial friction pad combination.

The device may include at least one of a longitudinal bearing and a radial bearing positioned between the inertia element and the inner surface of the receptacle and, positioned between the inertia element and the inner surface of the receptacle, at least one of a longitudinal biasing means and longitudinal friction pad combination or a radial biasing means and radial friction pad combination.

The device housing and receptacle may be configured such that movement of the inertia element relative to the device housing can comprise rotation through 360 degrees about the tool axis. The device housing may comprise a collar configured to be part of a drill string. The device housing may be affixed to or integral with a drill bit.

The inertia element may have an outer radius less than the outer radius of the housing, the inertia element may have an inner radius substantially equal to the radius of the central bore, and the receptacle may be in fluid communication with the central bore. Alternatively, the inertia element may have an outer radius substantially equal to the outer radius of the housing, the inertia element may have an inner radius greater than the radius of the central bore, and the receptacle may be in fluid communication with the environment surrounding the housing.

The inertia element may have a shape selected from the group consisting of square toroids, tori, and azimuthally-spaced segments.

A method for providing a damping tool for use with a bottomhole assembly (BHA), the damping tool including a torsional damping device and the torsional damping device including an inertia element and a damping fluid, may comprise the steps of:
  a) calculating a set of natural frequencies and mode shapes of the BHA based on the mechanical properties of the BHA;
  b) selecting at least one desired frequency from the calculated natural frequencies;
  c) calculating or measuring the frequency dependent damping response of a damping device and adjusting at least one property of the damping device so that the calculated or measured frequency dependent damping response corresponds to the at least one desired frequency; and
  d) using the calculated mode shapes to determine where to couple the damping device to the BHA.

The method may further include the steps of calculating, for at least a selected natural frequency of the BHA, the amplitude of vibration for each point along the BHA, identifying at least one location on the BHA at which amplitude of vibration at the selected natural frequency has a zero value and positioning the damping tool at the identified location. The BHA may comprise a drill bit. Step c) may comprise adjusting one or more properties selected from the group consisting of the mass of the inertia element, material density of the inertia element, moment of inertia of the inertia element to the tool axis, shape of the inertia element, shape of the tool, density of the damping fluid, and viscosity of the damping fluid, and selecting a value that results in a damping tool frequency that most closely matches the desired frequency. The torsional damping device may comprise a housing mechanically coupled to the downhole tool, the housing comprising an annular wall having a central bore therethrough. The wall may include a receptacle having a volume, and an inertia element may be movably supported in the receptacle. The inertia element may have a volume, a mass, and a non-zero moment of inertia about the tool axis. The volume of the receptacle may be greater than the volume of the inertia element so as to define an interstitial volume therebetween and the interstitial volume may be occupied by a fluid or an elastomer.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
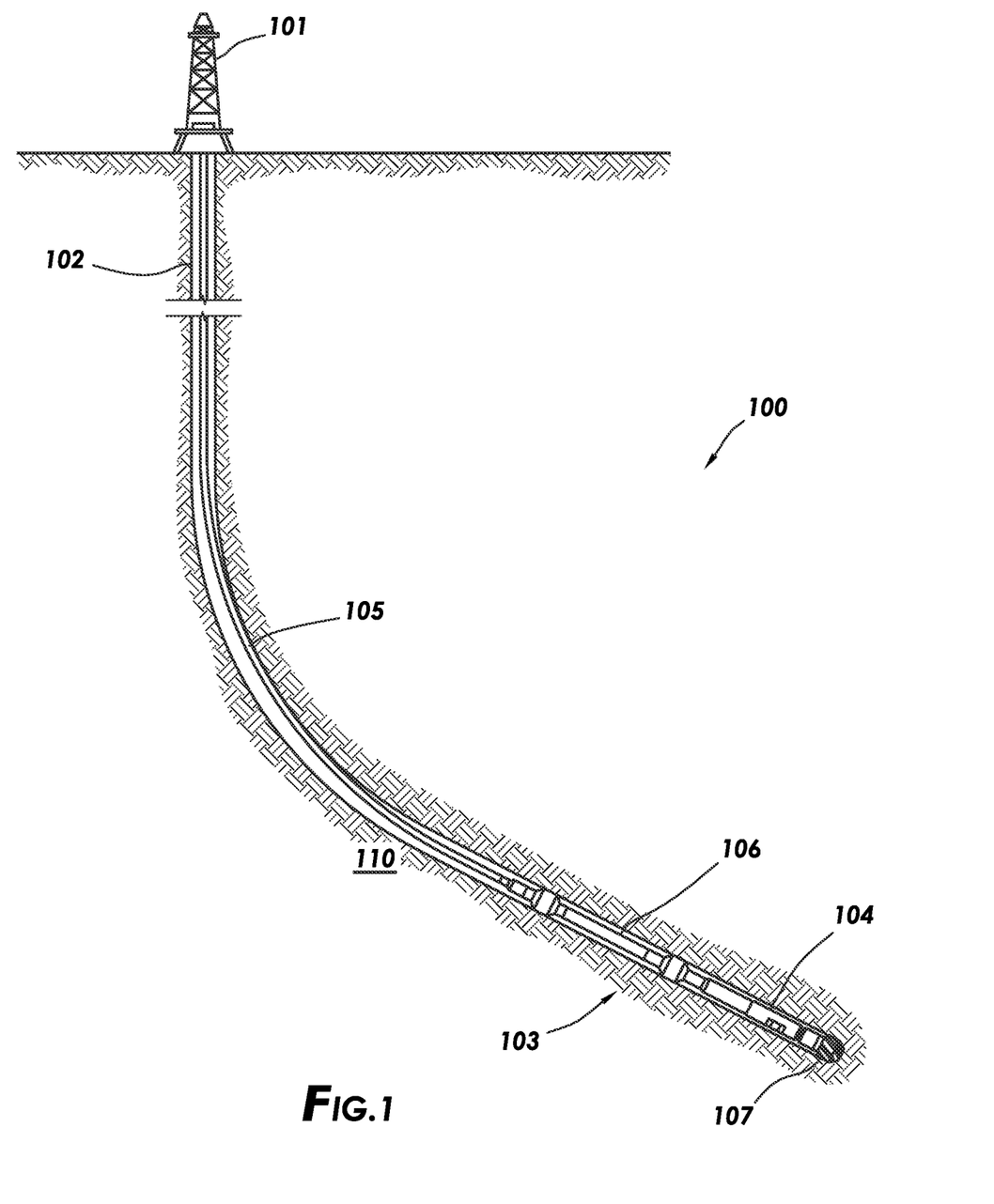
FIG. 1 is a schematic view of a drilling system in which embodiments of the current invention can be used.

Referring initially to FIG. 1, a drilling system 100 in which the present apparatus may be used may include a drilling rig 101 positioned above a wellbore 102 that extends into a subsurface formation 110. A drill string 105 may extend from drilling rig 101 into wellbore 102 and may terminate in a bottom hole assembly (BHA) 103. Drill string 105 may be driven by the surface equipment of the rig. In some embodiments, BHA 103 may include a drill bit 107, a motor 106, which may be a mud motor or other downhole motor, and a steerable system 104, which may be a rotary steerable system (RSS). BHA 103 may optionally include various other devices, such as logging or measurement devices, communications devices, and the like. If present, steerable system 104 may be used to steer the bit as the wellbore is drilled. The rotational force (torque) required to rotate drill bit 107 can be provided a torque creating or applying apparatus, which may be a drill string 105, motor 106, or a combination thereof.

Figure 2:
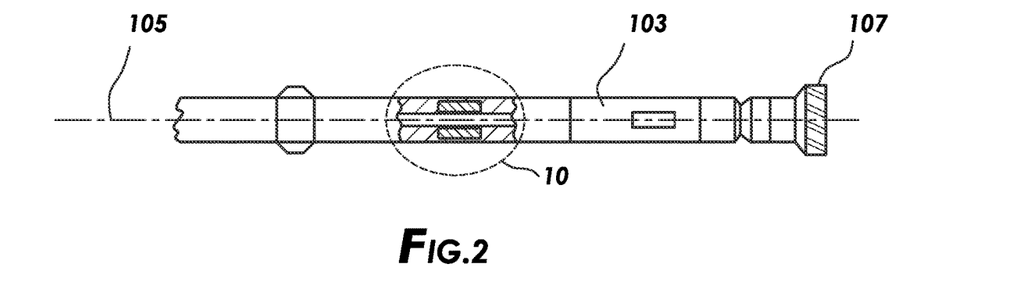
FIGS. 2-4 schematically illustrate possible locations for a damping device and its different setups for installation in a drilling system.
Figure 3:
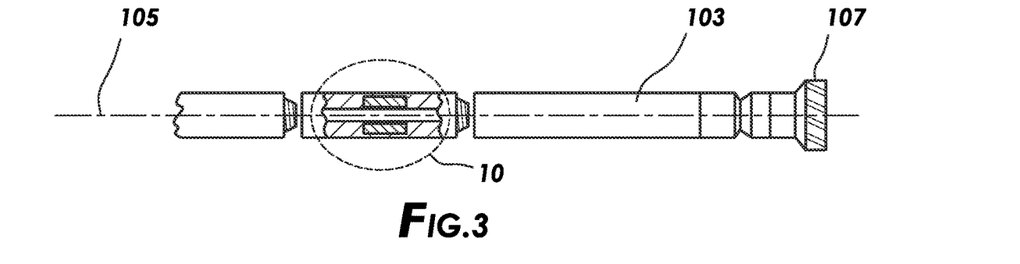
Figure 4:
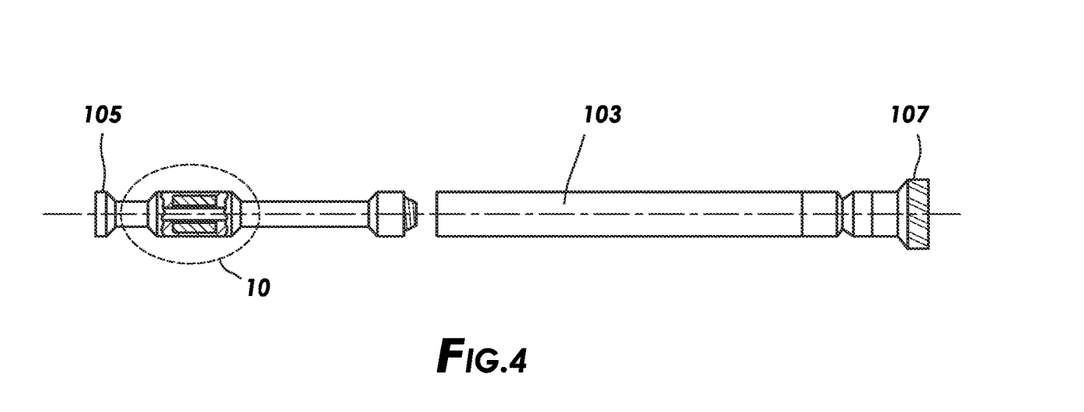

According to FIGS. 2-4, in some embodiments, one or more damping devices 10 may be positioned between the torque applying or creating apparatus and drill bit 107. By way of example only, a damping device 10 may be positioned between drill string 105 and drill bit 107 or between steerable system 104 and drill bit 107. Alternatively or additionally, a damping device may be part of the drill bit. In FIG. 2, damping device 10 is integrated in BHA 103. In FIG. 3, damping device 10 is provided on one or more standalone subs as an add-on to BHA 103. FIG. 3 shows a "modular" device, in which the functional features can be selectively added or removed at a rigsite. FIG. 4 shows a setup in which the functional features are integrated into a different component of the BHA (e.g. a stabilizer or a flex sub). If the damping device is included (integrated) in the BHA, adding or removing the damping device at the rigsite is only possible if the entire BHA component is added or removed. The optimal position of the damping device depends on a multitude of parameters. Optimal efficacy is reached when placed at an anti-node of the respective modal-shape.

Figure 5:
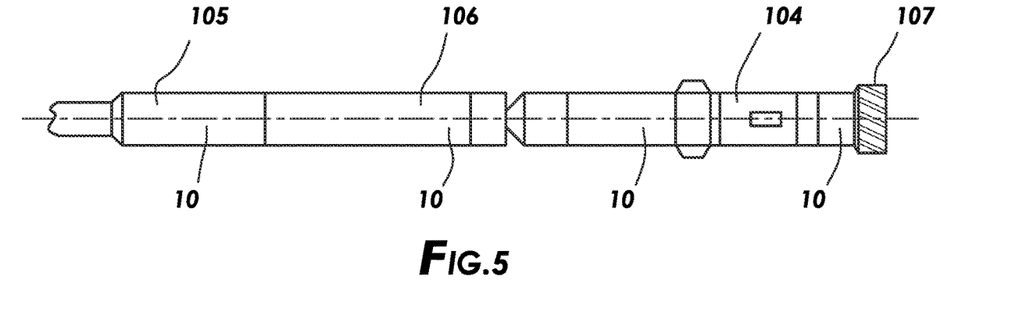
FIGS. 5-7 schematically illustrate possible locations for a damping device and its different setups for installation in a drilling system.
Figure 6:
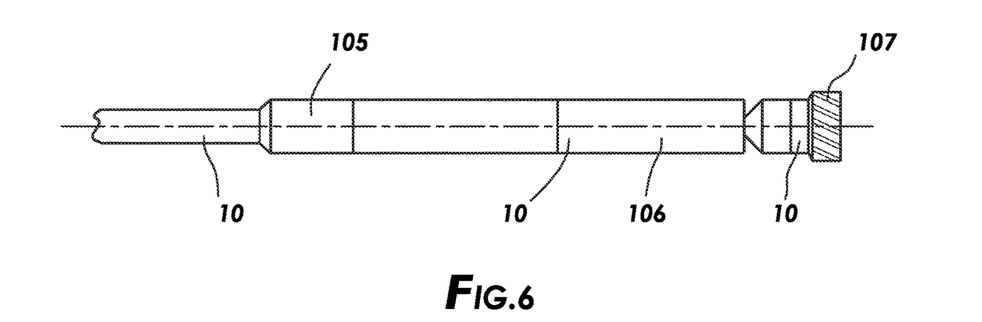
Figure 7:
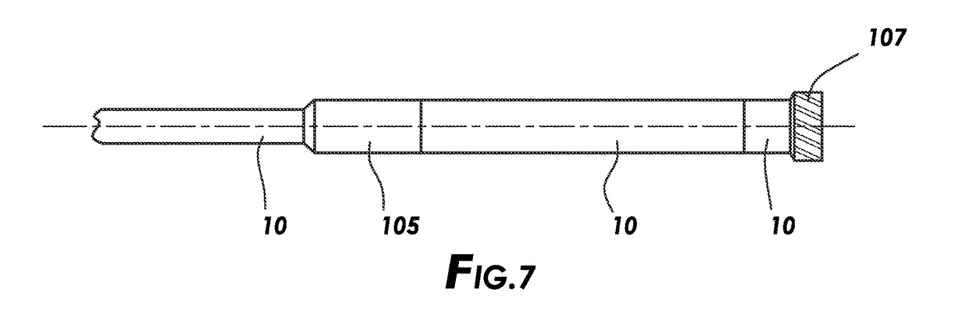

The damping device may be part of any BHA component. FIGS. 5-7 show various possible locations for the damping device 10 in the drillstring. Specifically, FIG. 5 shows several possible locations for the damping device 10 on a motor driven RSS BHA. FIG. 6 shows several possible locations for damping device 10 on a conventional motor driven BHA. FIG. 7 shows several possible locations for damping device 10 on a conventional BHA without motor and RSS.

Figure 8:
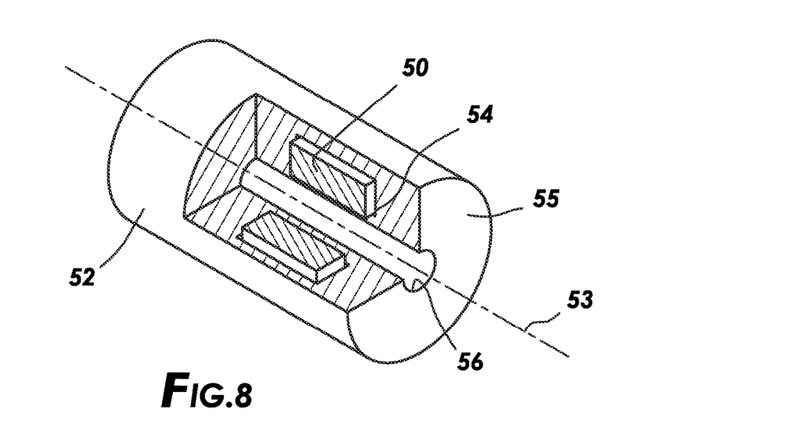
FIG. 8 is a cut-away view of a device in accordance with an embodiment of the invention.

Referring now to FIG. 8, some embodiments of damping device 10 comprise a housing 52, a receptacle 54 defined within housing 52, and at least one component with significant torsional inertia, illustrated as inertia element 50, disposed in receptacle 54. As used herein, "torsional inertia" refers to the tendency of an element to resist a change of rotation rate. In some cases, the torsional inertia of inertia element 50 should be as great as possible. In order to be effective, inertia element 50 has certain minimum desired inertia. The minimum desired inertia depends on the energy to be dissipated and can be adapted to the specific application.

In some embodiments, housing 52 may include an annular housing wall 55 defining a coaxial bore 56 and a coaxial cylindrical surface, which may serve as a fluid passage. The thickness of housing wall 55 is a matter of design preference and depends in part on the magnitude of drilling loads (torque, bending, etc.) that are expected to be conducted through either the housing or the receptacle. Inertia element 50 can be any shape having a non-zero moment of inertia about the longitudinal (rotational) axis 53 of the drill string. By way of example, inertia element 50 may be a square toroid (as illustrated), a torus, a plurality of azimuthally-spaced segments, or other distribution of mass within housing 52.

As discussed above, damping device 10 may be positioned on a component of the BHA. In such embodiments, damping device 10 may be coupled to the component by a common form-locked and/or force-locked connection, such as a press fit between bore 56 and a through-going shaft or between the cylindrical surface and a coaxial bore in said component, a serration, or the like. More than one damping device 10 may be placed at one location on a component of the BHA and damping devices 10 may be placed at more than one location on a BHA. Each of the plurality of devices may provide different damping. The devices may be similar except for their fluids and/or the inertia elements.

Figures 9, 10:
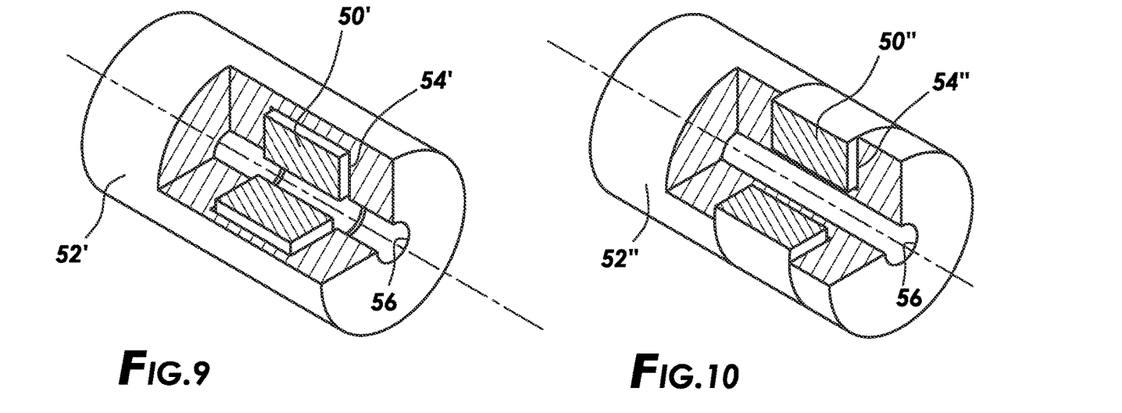
FIGS. 9-10 illustrate alternative embodiments of the device of FIG. 8.

Referring briefly to FIGS. 9-10, housing 52 and the position of inertia element 50 therein may have any suitable configuration, including but not limited to the embodiments shown at 52, 52', and 52", in which inertia elements 50, 50', and 50" and receptacles 54, 54', and 54", respectively, have different configurations.

Receptacle 54 is configured such that the volume of receptacle 54 is greater than the volume of inertia element 50 and defines an interstitial volume therewith. As set out in detail below, the interstitial volume, i.e., the volume of receptacle 54 that is not occupied by inertia element 50, may be filled with one or more fluids and/or elastomers.

Figure 11:
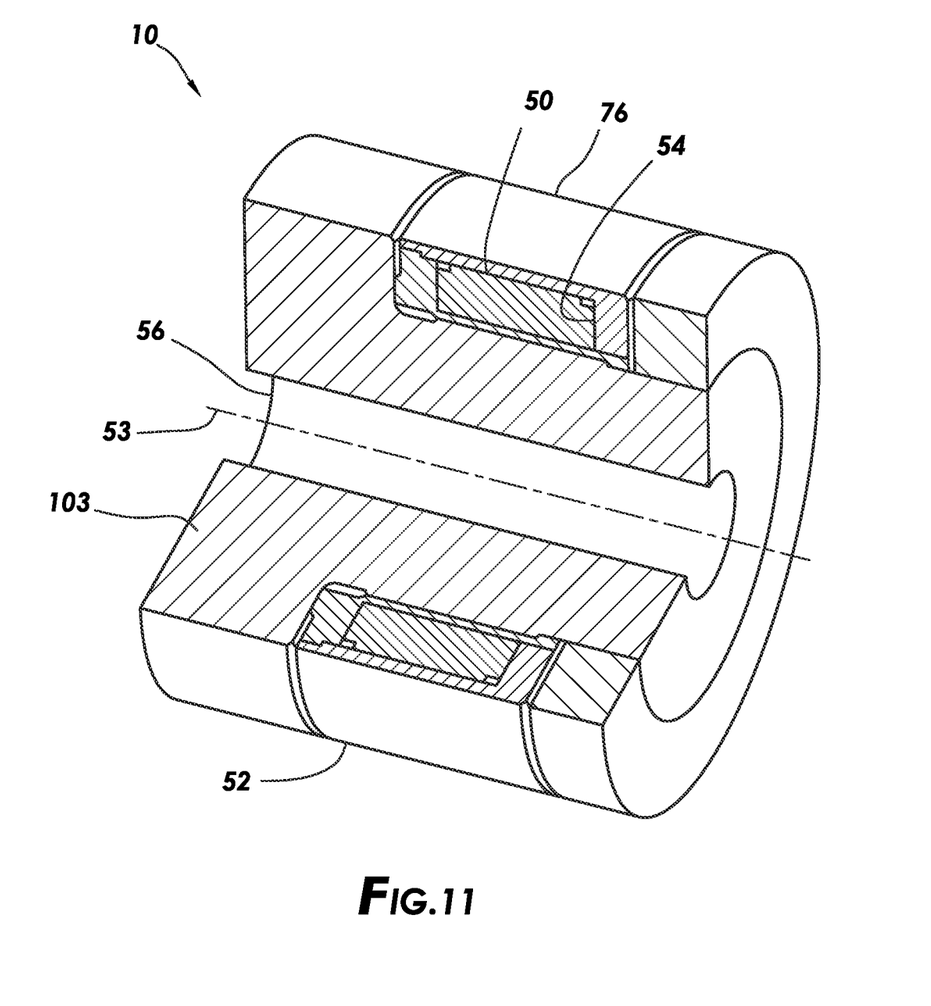
FIG. 11 is a cut-away view of a device in accordance with another embodiment of the invention.
Figure 12:
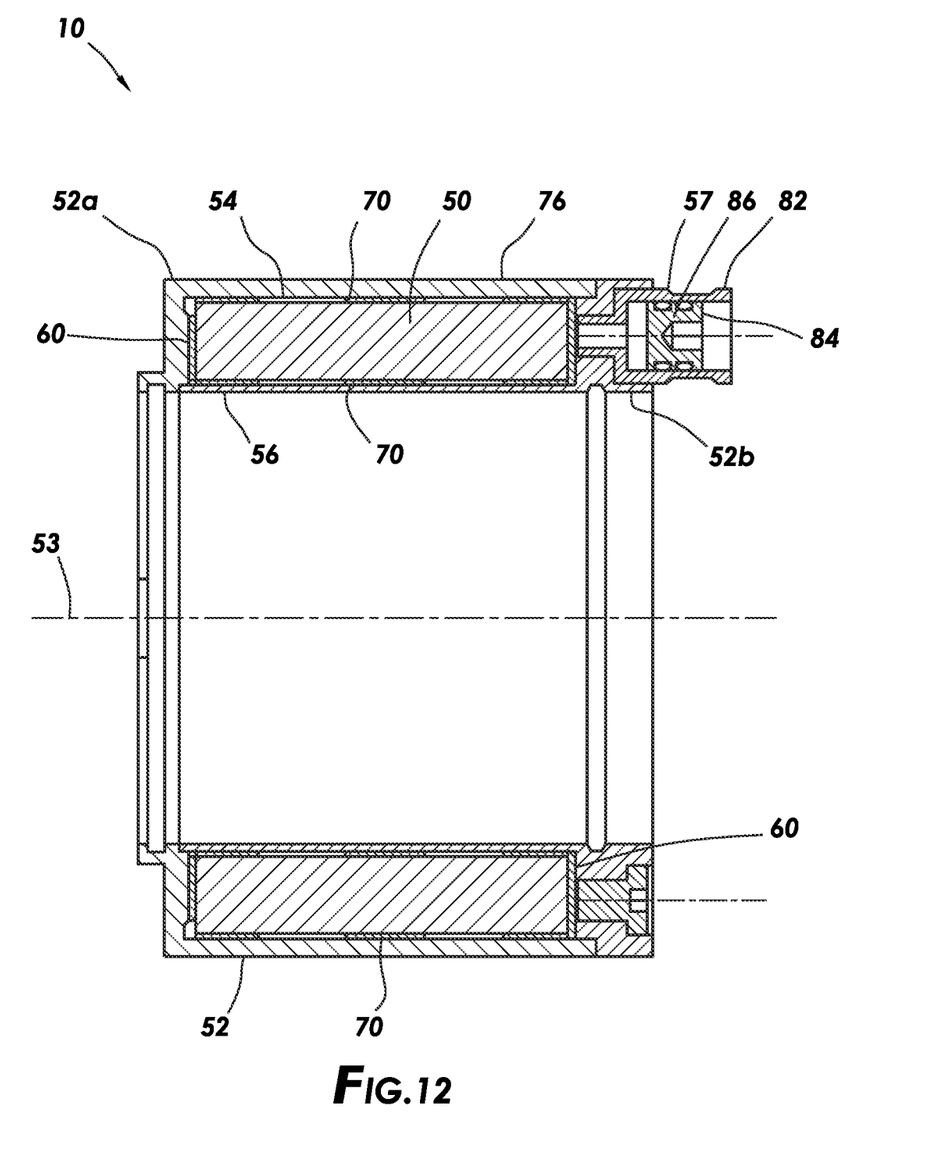
FIG. 12 is a cross-section illustrating one component of the embodiment of FIG. 11.

Referring now to FIGS. 11 and 12, in an alternative embodiment, inertia element 50 may be housed in a cartridge 76. Damping device 10 or, if configured as a cartridge, cartridge 76 may be mechanically coupled to a component of the BHA or otherwise mounted so as to transmit torsional vibrations and/or accelerations from the drill string 105 to the cartridge 76 and thereby to the contents of the cartridge 76, such as inertia element 50 and a comprised fluid. If a cartridge 76 is present, the interior of the cartridge may define receptacle 54. In some embodiments, cartridge 76 may be configured to be easily removed or replaced and/or to allow easy access to the contents of the cartridge.

In some embodiments, since the device is subject to well bore conditions, the fluid pressure in receptacle 54 may be adjusted to the pressure in the well bore using an optional pressure compensation feature 57. If present, pressure compensation feature 57 may be part of or attached to cartridge 76. FIG. 12 illustrates an exemplary embodiment in which a pressure compensation feature 57 comprises a compensation piston housing 82 having compensation piston 84 moveably mounted therein. Together, compensation piston housing 82 and compensation piston 84 define a variable compensation volume 86. Compensation piston 84 may or may not be equipped with a biasing means that tends to reduce the volume of compensation volume 86. Compensation volume 86 may be in fluid communication with receptacle 54 and thus filled with the same fluid as the interstitial volume. Movement of compensation piston 84 inside compensation piston housing 82 adjusts compensation volume 86 to achieve a pressure equilibrium between fluid in the well bore and fluid inside damping device 10.

In some embodiments (not shown), instead of being provided in conjunction with cartridge 76, pressure compensation feature 57 may be incorporated into or formed as part of housing 52. In these embodiments, compensation piston housing 82 and device housing 52 may be a single element and fluid communication between the wellbore and the back side of compensation piston 84 may comprise a fluid channel extending through a portion of housing 52, such as housing wall 55.

Relative movement between inertia element 50 and drill string 105 is partially restricted by friction generated as inertia element 50 moves within receptacle 54. As a result, some of the kinetic energy of the drill string is dissipated as heat. Because of the transformation of kinetic energy into heat, the damping fluid may expand, increasing pressure inside receptacle 54. In some embodiments, housing 52 may contain the pressure and in some embodiments pressure compensation feature 57 may be used to maintain a desired fluid pressure in receptacle 54. Alternatively or additionally, the gap(s) between the outer diameter of housing and adjacent equipment may be eliminated or filled with a thermally conductive material so as to enhance the conductance of heat away from housing 52 and create a path for removing the generated heat.

The embodiment of FIG. 12 also includes a two-part housing 52, comprising an outer housing 52a and an inner housing 52b. Housing 52 may comprise a single element or may comprise an assembly of two or more parts, which may be, by way of example only, welded together.

In some embodiments, inertia element 50 can be supported within receptacle 54 in a manner that allows inertia element 50 to rotate about axis 53 without contacting the walls of receptacle 54. Still referring to FIG. 12, in some embodiments, the support for inertia element 50 may optionally include longitudinal bearings 60 and/or radial bearings 70 in addition to a fluid. Longitudinal bearings 60 may be positioned between the end(s) of inertial element 50 and the inner surface of receptacle 54. Radial bearings 70 may be positioned between the inside and/or outside of inertial element 50 and the inner surface of receptacle 54. Bearings 60, 70 can be sliding bearings or roller bearings. If present, longitudinal and/or radial bearings 60, 70 can be configured such that inertia element 50 rotates around the centerline of the damping device 10. In some embodiments, inertia element 50 is disposed in housing 52 in a manner that allows at least some rotation of inertia element 50 about axis 53 relative to housing 52. In some embodiments, rotation of inertia element 50 about axis 53 is not restricted; in such embodiments, it is possible for inertia element 50 to rotate through 360 degrees.

If present, longitudinal and/or radial bearings 60, 70 can also be configured such that a certain predetermined gap between housing and inertia ring is maintained. One function of bearings 60, 70 is to maintain a substantially uniform circumferential gap by preventing inertia element 50 from coming into contact with the inner surface of receptacle 54. A second function is functional separation. In preferred embodiments the friction is generated primarily by the fluid, which is free from wear, deterioration and undesired properties. In some alternative embodiments (e.g. FIGS. 15 & 16) bearings 60, 70 may be similar to friction pads (discussed in detail below) and may serve both purposes (separation and friction) simultaneously.

Figure 13:
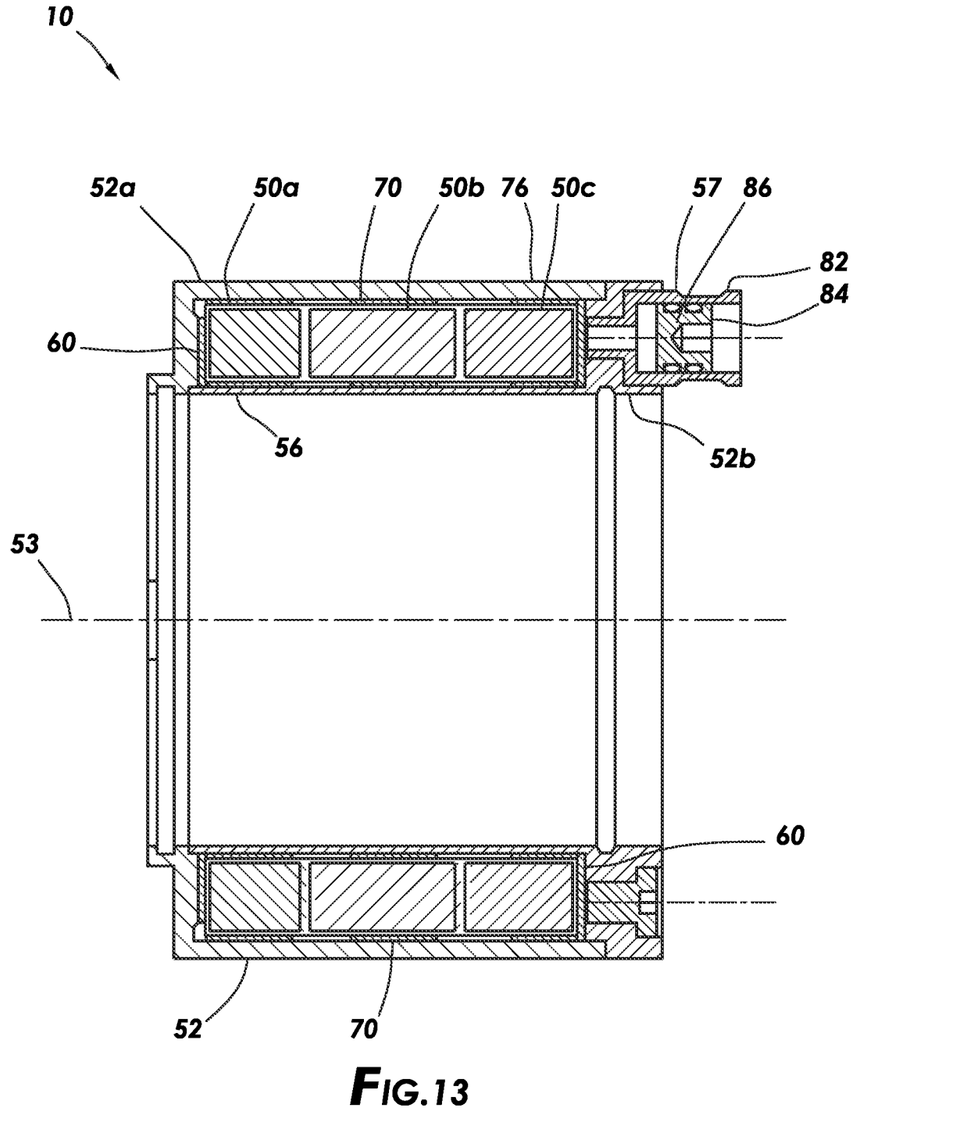
FIGS. 13-14 are cross-sectional and isometric partial cutaway views, respectively, of another embodiment of the invention.
Figure 14:
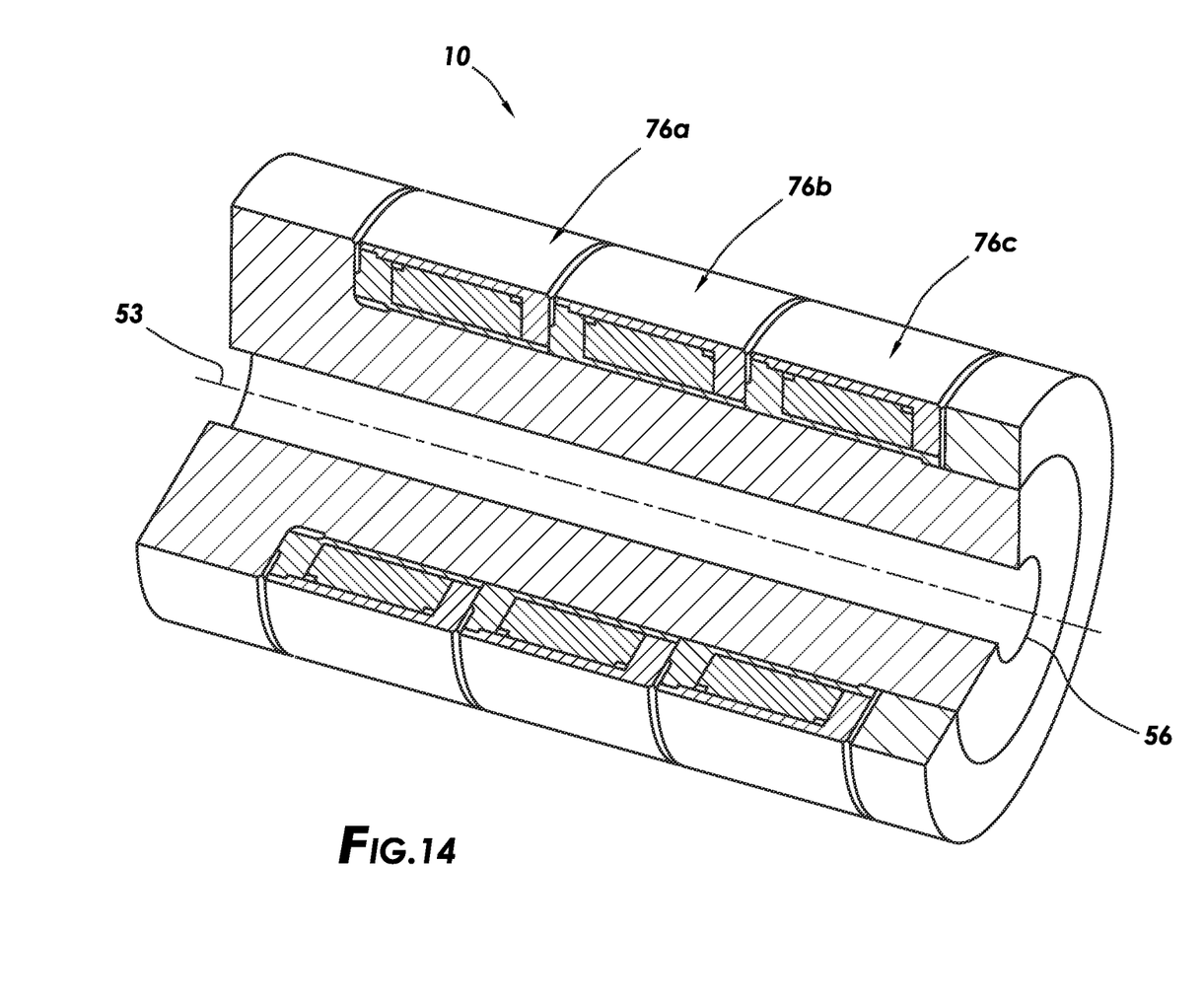

Referring briefly to FIGS. 13-14, in other embodiments, inertia element 50 may be provided as two or more individual inertia elements, such as those illustrated at 50a, 50b, and 50c. Individual inertia elements 50a, 50b, and 50c may be provided within a single cartridge 76, as shown in FIG. 13, or may be provided in separate cartridges 76a, 76b, 76c, as shown in FIG. 14. Inertia elements 50a, 50b, and 50c may differ in their individual inertias by i) having a different volume, ii) being made of materials having different densities, iii) having different moments of inertia, or a combination of these options.

Regardless of the configuration of the inertia element 50 and receptacle 54, in some embodiments the interstitial volume between inertia element 50 and receptacle 54 may be filled with a fluid. In such instances, the portion of receptacle 54 that is not occupied by inertia element 50 may be occupied by a specifically selected damping fluid, such as a viscous medium including, for example, silicone oil. The damping fluid may have a high viscosity, such as for example up to 1,000,000 cSt at 25° C. An example of a suitable fluid is silicone oil. In some embodiments, housing 52 and/or pressure compensation feature 57 may each include ports and channels (not shown) for evacuating or filling pressure compensation feature 57 and the volume between housing 52 and inertia element 50 with damping fluid.

In still other embodiments, the portion of receptacle 54 that is not occupied by inertia element 50 may be occupied by an elastomer or one or more elastomeric bodies. The elastomer needs to have specific elastic and damping properties so that it can deform and dissipate energy while deforming. For both choices (a high viscosity fluid and an elastomer) it is required that the molecular chains of the material move relative to each other so as to dissipate energy. In addition, the elastomer is preferably to be attached to both the housing 52 and the inertia element 50 in order to transmit torque therebetween.

The presence of a viscous fluid or elastomer between the inertia element 50 and the housing 52 will result in friction whenever inertia element 50 moves relative to housing 52. The friction between inertia element 50 and housing 52 allows the transmission of torque from housing 52 to inertia element 50. Because fluid is a poor transmitter of force and the elastomer is preferably selected to be likewise an absorber of force, a portion of the force imparted by housing 52 will be converted to heat instead of being transmitted to inertia element 50. Thus, as vibrations and/or rotational forces are transmitted to housing 52, they will be resisted and damped by the action of the inertial element on the fluid.

Figure 15:
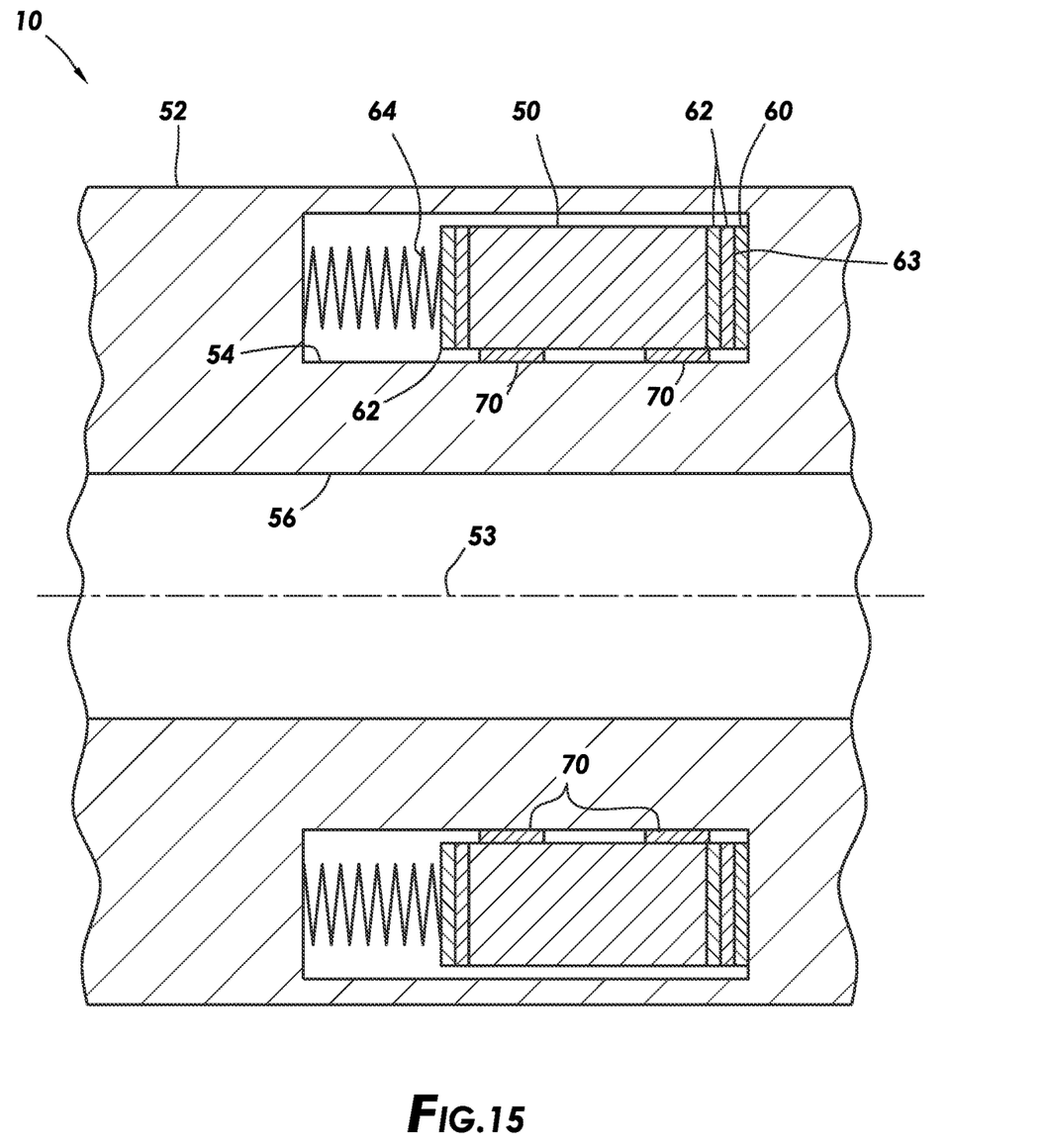
FIG. 15 is a schematic cross-section illustrating another embodiment of the invention.

By way of example only and referring to FIG. 15, alternatively or in addition to a damping fluid, damping device 10 may be equipped with one or more pairs of longitudinal friction pads 62 that act in conjunction with one or more longitudinal biasing means 64 and inertia element 50. In the illustrated embodiment, longitudinal biasing means 64 urges inertia element 50 toward one end of receptacle 54 and into engagement with longitudinal friction pad(s) 62. Longitudinal biasing means 64 and pairs of longitudinal friction pad(s) 62 may each be provided at either or both ends of inertia element 50.

Figure 16:
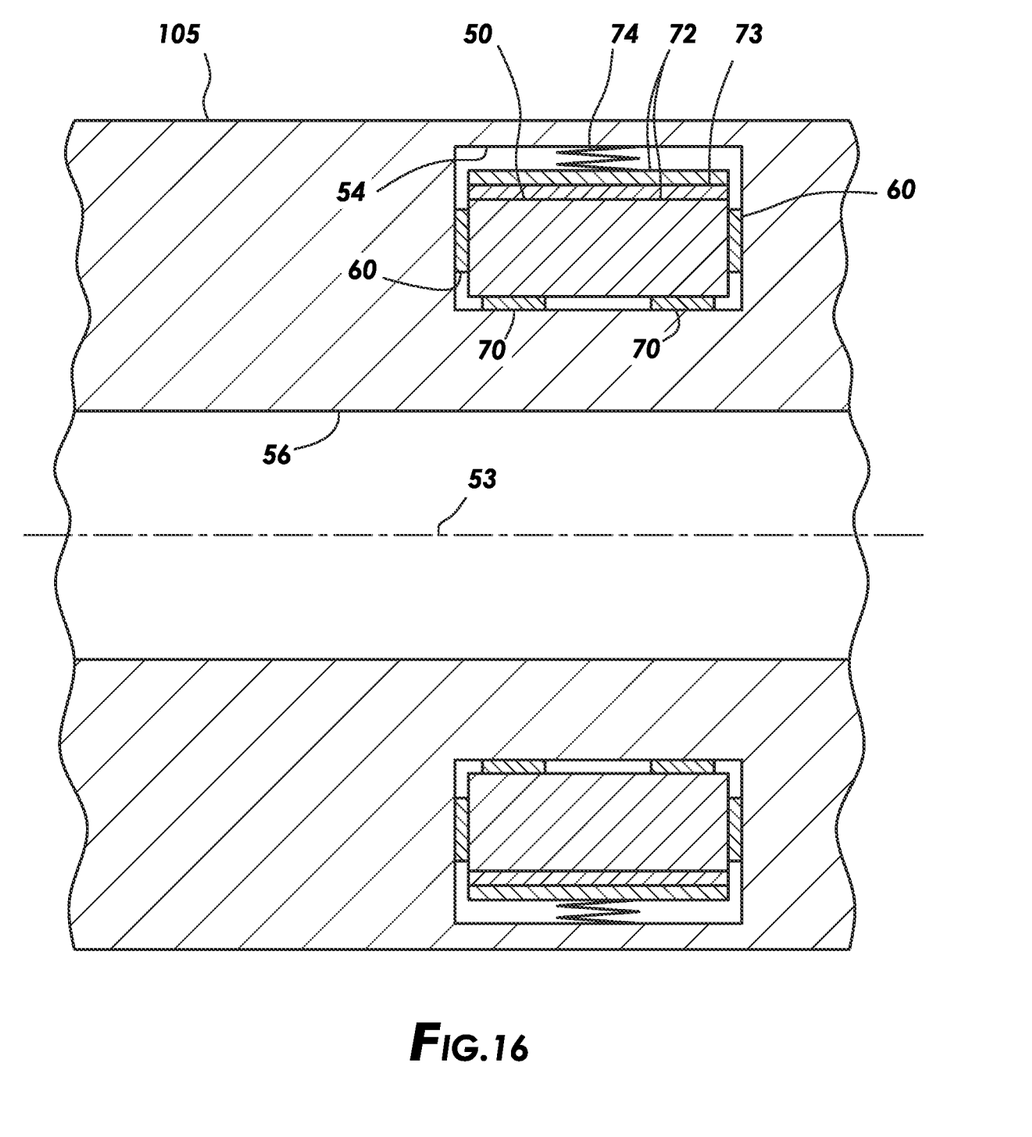
FIG. 16 is a schematic cross-section illustrating another embodiment of the invention.

Alternatively or in addition to longitudinal compression and friction, and referring to FIG. 16, damping device 10 may be equipped with one or more pairs of radial friction pads 72 that act in conjunction with one or more radial biasing means 74 and inertial element 50. Radial friction pads 72 may be radially inward and biasing means 74 may be radially outward of inertia element 50, as shown, or vice versa. One radial friction pad 72 may be affixed to biasing means 74 and a second radial friction pad 72 may be affixed to inertia element 50, so that when inertia element 50 rotates relative to housing 52, energy is dissipated as heat at the interface between the two friction pads.

Each pair of friction pads 62, 72 defines a pad interface 63, 73, respectively, therebetween. By way of example, as illustrated at the left-hand end of inertia element 50 (FIG. 15, as drawn), one longitudinal friction pad 62 may be affixed to longitudinal biasing means 64 and a second longitudinal friction pad 62 may be affixed to inertia element 50, so that when inertia element 50 rotates relative to housing 52, energy is dissipated as heat at the interface between the two friction pads. Friction pads 62, 72 may comprise any material or combination of materials that provides a desired coefficient of friction at pad interface 63 and can withstand the temperatures associated with the downhole environment and the intended dissipation of energy.

In embodiments that include friction pads, the energy dissipation depends, not on the medium in the interstitial volume, but on friction between individual friction pads 62, 72. Thus, in this embodiment, it is possible to replace the viscous damping fluid with any kind of fluid, even drilling mud. Thus, in certain embodiments, inertia element 50 does not need to be fully enclosed in housing 52 and receptacle 54, i.e. the volume in which inertia element 50 is housed, may be in fluid communication with either the outside or the inside (bore) of the drilling tool. By way of example, FIG. 9 illustrates an embodiment in which housing 52' is configured such that receptacle 54' is in fluid communication with bore 56 and FIG. 10 illustrates an embodiment in which housing 52" is configured such that receptacle 54" is in fluid communication with the environment outside of housing 52". In either case, longitudinal bearings, longitudinal friction pads, and longitudinal biasing means may optionally also be included in receptacle 54, along with radial bearings, as described above.

Referring again to FIGS. 2-7, a damping device 10 can be used to increase the reliability of an RSS and/or components of the RSS or BHA. Damping device 10 is especially advantageous in operations that have no designated vibration damping drill string component. Damping device 10 can be integrated into a drill string as a separate device, and/or as a separate device positioned within another drill string member (cartridge), or by integrating its components into a torque-transmitting member of the drill string.

In some embodiments, damping device 10 can be tuned to at least one torsional natural frequency of the tool or component it is intended to protect, which may include, for example, the BHA, RSS, or other components of the RSS. In these embodiments, the tool or component is modeled and its natural frequency(ies) is(are) calculated.

Figure 17:
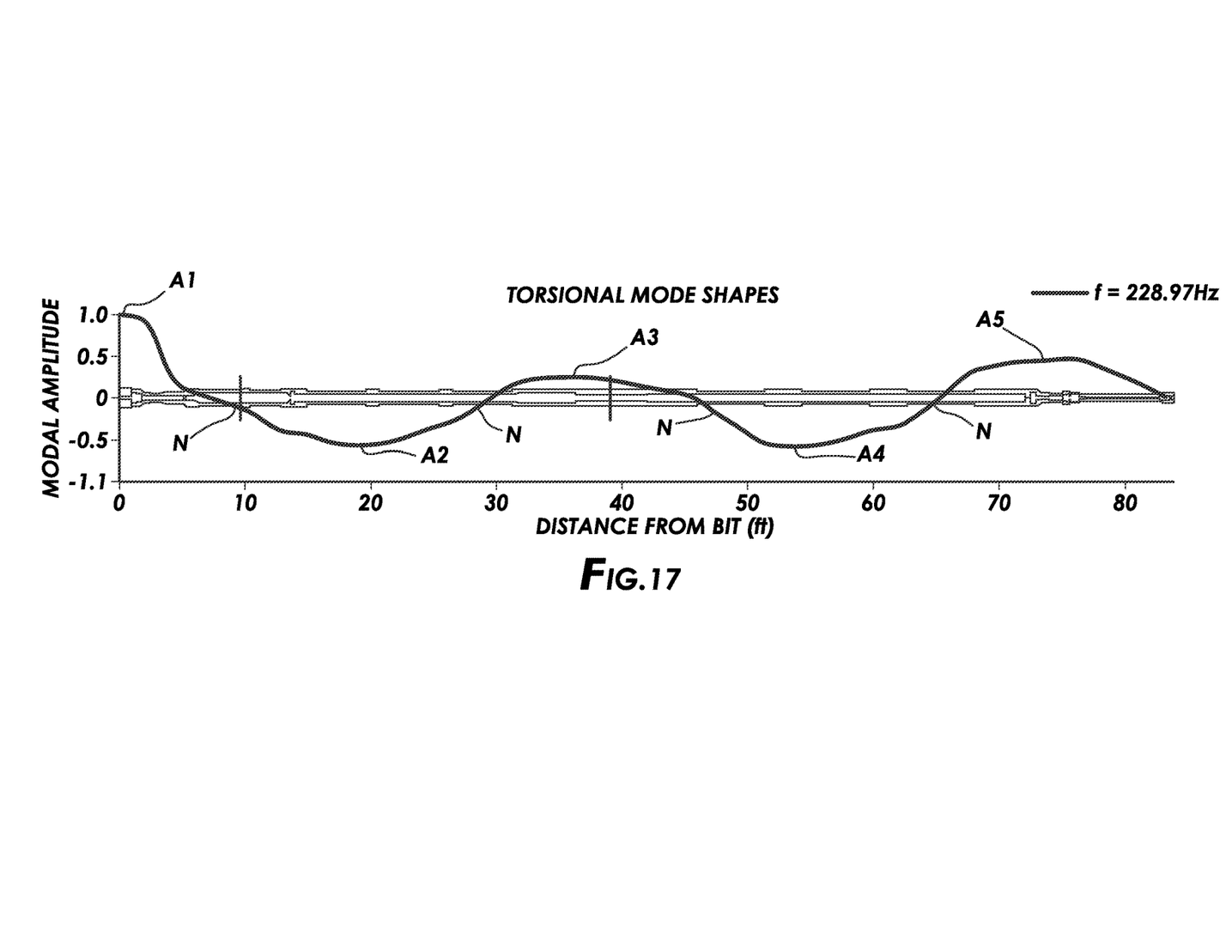
FIG. 17 is a schematic illustration of torsional vibrational nodes of part of a drill string.

According to some embodiments, damping device 10 can be adapted to a drill string or component thereof using the following steps:

a) Calculate the torsional natural frequencies, also referred to as Eigen Values or eigenfrequencies, and mode shapes (Eigen Vectors) based on the mechanical properties of the BHA (ODs, IDs, Lengths, and Material Properties). The calculation may be based on a finite elements analysis or the like. Boundary conditions may be selected such that the system being examined is free to rotate at one end and can be fixed, free, or weakly supported at the opposite end.

b) Tune the damping device characteristics to match the desired frequencies. Each damping device 10 will have frequency dependent damping properties; tuning entails adjusting the frequency dependent damping properties of the device to correspond to the at least one desired frequency. The frequency dependent damping properties can be adjusted by adjusting one or more parameters including the inertia (mass, material density, lever to axis of rotation, etc.) and damping characteristics (type of fluid, fluid viscosity, shear gap width, shear gap length, coefficient of friction, preload, etc.) of the damping device. In some instances, the target frequency may be from 30 Hz up to 1000 Hz. The tuning may be carried out empirically or using mathematical models.

c) Use the calculated mode shapes to select a location for the damping device. As illustrated schematically in FIG. 17, for a given tool and frequency, a mathematical model can be used to calculate the amplitude of vibration at each point along the tool. As illustrated in FIG. 17, the amplitude will tend to vary between antinodes A1, A2, A3 . . . , i.e. points along the Eigen Vector in which the amplitude is a local maximum or minimum, along the length of the tool, with a node N (zero value) between each pair of adjacent antinodes. Depending on the tool, the antinodes may increase or diminish in amplitude along the length of the tool, with the greatest amplitude (greatest maximum) being closest to one end of the tool.

Figure 18A:
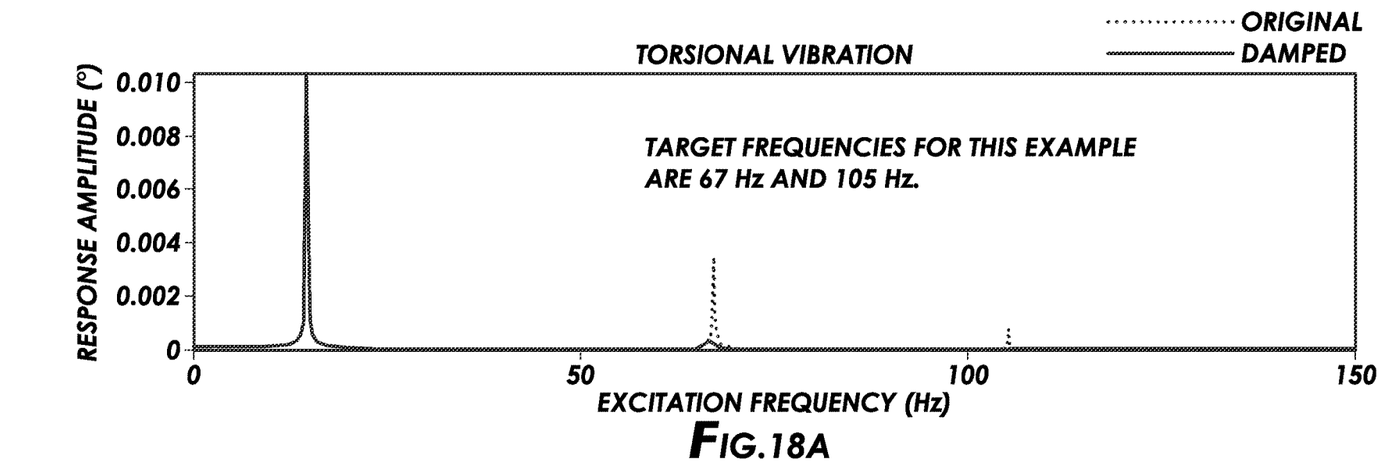
FIGS. 18A and 18B are plots of models illustrating damping of torsional vibration at target frequencies.
Figure 18B:
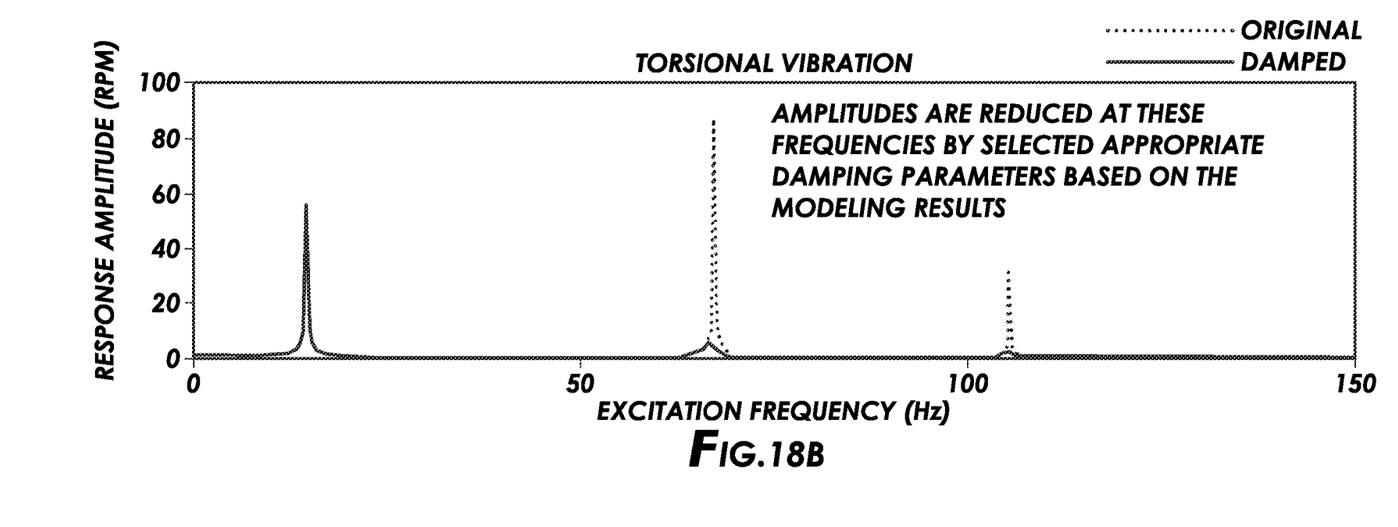

In some embodiments, it may be advantageous to position a damping device 10 at each of one or more anti-nodes. In some instances, it may be desirable to position a damping device 10 close to or at the point with the largest absolute value of modal displacement. FIG. 18 illustrates damping of torsional vibration measured in degrees (FIG. 18A) and rpm (FIG. 18B).

A system including one or more damping devices may be configured to damp vibrations at one or more frequencies. In some embodiments, damping devices tuned to different frequencies can be used to damp multiple (separate) frequencies. In other embodiments, a single damping device that is capable of damping a broad range of frequencies can be used. The effective frequency range of a damping device can be influenced by various parameters, as set out above.

The purpose of the present damping device is to protect the BHA, or certain parts of said BHA, from torsional vibrations that exceed detrimental magnitudes. In some instances, the device may be used for damping loads that occur during drilling operation, such as torque peaks and/or torsional accelerations/oscillations. A drilling system may include one or a plurality of said damping devices in different locations. The damping device can be an integral part of the BHA or one of its components, where all needed elements are integrated into readily available tools. It can also be added to the BHA as a separate device (module), where all elements are integrated into a tool on its own.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art may readily use the present disclosure as a basis for designing or modifying other processes and structures for carrying out the same purposes and/or achieving the same advantages of the embodiments introduced herein. One of ordinary skill in the art may make various changes, substitutions, and alterations without departing from the scope of the present disclosure.

What is claimed is:

1. A passive vibration damping device for use with a downhole tool, the downhole tool having a tool axis, the vibration damping device comprising:
 a device housing mechanically coupled to the downhole tool, wherein the device housing includes a receptacle having a volume and an inner surface; and
 an inertia element movably supported in the receptacle and having a volume, a mass, and a non-zero moment of inertia about the tool axis;
 at least one of a longitudinal bearing and a radial bearing positioned between the inertia element and the inner surface of the receptacle
 wherein the volume of the inertia element is less than the volume of the receptacle so that an interstitial volume is defined between the inertia element and the receptacle, and wherein the interstitial volume is occupied by a fluid or an elastomer; and
 wherein the inertia element is supported within the receptacle in a manner that allows the inertia element to move relative to the device housing.

2. The device of claim 1, and further including:
 a cartridge mechanically coupled to the downhole tool, wherein cartridge defines the receptacle.

3. The device of claim 2, further including positioned between the inertia element and the inner surface of the receptacle, at least one of:
 a longitudinal biasing means and longitudinal friction pad combination; and
 a radial biasing means and radial friction pad combination.

4. The device of claim 1, further including positioned between the inertia element and the inner surface of the receptacle, at least one of a longitudinal biasing means and longitudinal friction pad combination or a radial biasing means and radial friction pad combination.

5. The device of claim 1 wherein the device housing and receptacle are configured such that movement of the inertia element relative to the device housing can comprise rotation through 360 degrees about the tool axis.

6. The device of claim 1 wherein the device housing comprises a collar configured to be part of a drill string.

7. The device of claim 1 wherein the device housing is affixed to or integral with a drill bit.

8. The device of claim 1 wherein the housing comprises an annular wall having a central bore therethrough, wherein the inertia element has an outer radius less than the outer radius of the housing, wherein the inertia element has an inner radius substantially equal to the radius of the central bore, and wherein the receptacle is in fluid communication with the central bore.

9. The device of claim 1 wherein the housing comprises an annular wall having a central bore and an outer radius, wherein the inertia element has an outer radius substantially equal to the outer radius of the housing, wherein the inertia element has an inner radius greater than the radius of the central bore, and wherein the receptacle is in fluid communication with the environment surrounding the housing.

10. The device of claim 1 wherein the inertia element has a shape selected from the group consisting of square toroids, tori, and azimuthally-spaced segments.

11. The device of claim 1, further comprising a pressure compensation feature adapted to adjust the pressure inside the device housing to the pressure in a wellbore.

12. The device of claim 11 wherein the pressure compensation housing is formed separately from the device housing and the pressure compensation housing and the cartridge are both received within the device housing.

13. The device of claim 11 wherein the pressure compensation housing comprises the device housing.

14. The device of claim 11 wherein the pressure compensation housing is formed separately from the device housing and is received within the device housing.

* * * * *